(12) United States Patent
Guilbert et al.

(10) Patent No.: US 9,274,531 B2
(45) Date of Patent: Mar. 1, 2016

(54) THERMOSTATIC FLUID SUPPLY INVERTER VALVE

(71) Applicant: Kohler Co., Kohler, WI (US)

(72) Inventors: Daniel Guilbert, Bouilly (FR); Bernard Barrault, Merphy (FR); Diego Russo, Chenay (FR)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 14/201,558

(22) Filed: Mar. 7, 2014

(65) Prior Publication Data

US 2014/0251445 A1    Sep. 11, 2014

Related U.S. Application Data

(60) Provisional application No. 61/775,248, filed on Mar. 8, 2013.

(51) Int. Cl.
F15B 13/00 (2006.01)
G05D 23/13 (2006.01)
F16K 11/00 (2006.01)
F16K 27/00 (2006.01)

(52) U.S. Cl.
CPC .......... *G05D 23/1306* (2013.01); *F16K 19/006* (2013.01); *F16K 27/00* (2013.01); *G05D 23/1353* (2013.01); *Y10T 137/0491* (2013.01); *Y10T 137/6011* (2013.01)

(58) Field of Classification Search
CPC .......... G05D 23/1353; G05D 23/1306; F16K 19/006; F16K 27/00; Y10T 137/0491; Y10T 137/6011
USPC ....................... 137/269, 15.01, 606
See application file for complete search history.

(56) References Cited

U.S. PATENT DOCUMENTS 6,279,604 B1   8/2001   Korb et al.
7,240,850 B2   7/2007   Beck et al.
7,823,603 B2   11/2010   Cochart et al.

*Primary Examiner* — John K Fristoe, Jr.
*Assistant Examiner* — Umashankar Venkatesan
(74) *Attorney, Agent, or Firm* — Foley & Lardner LLP

(57) ABSTRACT

An assembly for a thermostatic mixing valve includes a valve body including a first fluid channel having a first inlet port for receiving a first fluid from a first fluid supply line, a second fluid channel having a second inlet port for receiving a second fluid from a second fluid supply line, and a cartridge chamber having a first layer, a second layer offset from the first layer, and an opening for receiving a thermostatic mixing cartridge. A first removable insert guides the first fluid to the first layer when inserted into the first fluid channel and guides the second fluid to the first layer when inserted into the second fluid channel. A second removable insert guides the first fluid to the second layer when inserted into the first fluid channel and guides the second fluid to the second layer when inserted into the second fluid channel.

20 Claims, 12 Drawing Sheets

Section C-C

Section D-D

Section E-E

Section F-F

THERMOSTATIC FLUID SUPPLY INVERTER VALVE

CROSS-REFERENCE TO RELATED PATENT APPLICATIONS

This application claims the benefit of and priority to U.S. Provisional Patent Application No. 61/775,248, filed Mar. 8, 2013. The entire disclosure of U.S. Provisional Patent Application No. 61/775,248 is incorporated by reference herein.

BACKGROUND

The present disclosure relates generally to fluid mixing valves and more particularly to thermostatic mixing valves having an improved adaptability to an inverted fluid supply configuration.

Thermostatic mixing valves can provide a source of water having a desired temperature and can maintain the desired water temperature substantially constant once set. Such devices are well known in the art. For example, U.S. Pat. Nos. 6,279,604 and 7,240,850 describe various embodiments of a thermostatic mixing valve. Typically, the desired water temperature is obtained by controlling the relative proportions of hot and cold water admitted to a mixing chamber and adjusting the relative proportions to maintain the desired water temperature substantially constant.

To control the relative proportions of hot and cold water admitted to the mixing chamber, a temperature-sensitive element can be provided. The temperature-sensitive element may expand or contract based on the temperature of the water in the mixing chamber. The temperature-sensitive element may be connected to a piston configured to variably adjust an amount of the hot or cold water permitted to enter the mixing chamber based on the state of the temperature-sensitive element.

While these thermostatic mixing valves are known in the art, these devices suffer from a number of disadvantages. For example, current thermostatic mixing valves may not operate properly unless the hot and cold water enter the valve through designated hot and cold fluid inlet ports. If the thermostatic valve is improperly connected, the temperature-sensitive element may cause the piston to open or close the wrong inlet port in response to a change in temperature.

Current solutions to this problem typically involve replumbing the hot and cold water supply lines or reinstalling the valve in an upside-down configuration such that the hot and cold water enter the valve through the proper inlet ports. However, such solutions are burdensome and may require the wall to be broken and reconstructed. There remains a need for a thermostatic mixing valve that can adapt to an inverted fluid supply line configuration.

SUMMARY

One implementation of the present disclosure is an assembly for a thermostatic mixing valve. The assembly includes a valve body, a first removable insert, and a second removable insert. The valve body includes a first fluid channel having a first inlet port for receiving a first fluid from a first fluid supply line, a second fluid channel having a second inlet port for receiving a second fluid from a second fluid supply line, and a cartridge chamber having a first layer, a second layer offset from the first layer, and an opening for receiving a thermostatic mixing cartridge. Each of the first and second removable inserts may be inserted into either the first fluid channel or the second fluid channel. The first removable insert guides the first fluid to the first layer when inserted into the first fluid channel and guides the second fluid to the first layer when inserted into the second fluid channel. The second removable insert guides the first fluid to the second layer when inserted into the first fluid channel and guides the second fluid to the second layer when inserted into the second fluid channel.

In some embodiments, the first fluid channel has a first insert opening in addition to the first inlet port and the second fluid channel has a second insert opening in addition to the second inlet port. In some embodiments, wherein the first and second removable inserts are insertable into the first and second fluid channels via the first and second insert openings.

In some embodiments, the first insert opening and the second insert opening are located along a same surface of the valve body. In some embodiments, the first removable insert and the second removable insert are inserted into the first and second openings in a same direction as the thermostatic cartridge is inserted into the cartridge chamber.

In some embodiments, the valve body further includes a mixing chamber fluidly connected with the cartridge chamber for receiving the thermostatic mixing cartridge, a second cartridge chamber for receiving a volume control cartridge, and a fluid passage connecting the mixing chamber with the second cartridge chamber.

In some embodiments, the first fluid channel includes a first connection port fluidly connected with the first layer of the cartridge chamber and a second connection port fluidly connected with the second layer of the cartridge chamber. In some embodiments, the second fluid channel includes a third connection port fluidly connected with the first layer of the cartridge chamber and a fourth connection port fluidly connected with the second layer of the cartridge chamber.

In some embodiments, the first fluid channel and the second fluid channel are substantially cylindrical channels extending completely through the valve body and the connection ports are openings in circumferential faces of the first and second fluid channels.

In some embodiments, each of the first and second removable inserts is a substantially cylindrical shell having an open end, a closed end opposite the open end, and a circumferential surface connecting the open end with the closed end. In some embodiments, the closed ends completely cover openings in the valve body through which the removable inserts are inserted into the first and second fluid channels when the removable inserts are inserted into the fluid channels.

In some embodiments, each of the first and second removable inserts include a plurality of openings in the circumferential surfaces thereof. In some embodiments, the openings in the circumferential surface of the first removable insert are configured to align with the first layer of the cartridge chamber when the first removable insert is inserted into either of the first or second fluid channels. In some embodiments, the openings in the circumferential surface of the second removable insert are configured to align with the second layer of the cartridge chamber when the second removable insert is inserted into either of the first or second fluid channels.

In some embodiments, the first and second removable inserts are configured to receive the first and second fluids via the open ends thereof and to guide the first and second fluids to a subset of the connection ports when inserted into the first and second fluid channels.

In some embodiments, the first removable insert is configured to guide the first fluid to the first connection port when inserted into the first fluid channel and to guide the second fluid to the third connection port when inserted into the second fluid channel. In some embodiments, the second removable insert is configured to guide the first fluid to the second connection port when inserted into the first fluid channel and to guide the second fluid to the fourth connection port when inserted into the second fluid channel.

In some embodiments, the first removable insert has an opening in a circumferential surface thereof. In some embodiments, the opening is configured to align with the first connection port when the first removable insert is inserted into the first fluid channel and to align with the third connection port when the first removable insert is inserted into the second fluid channel.

In some embodiments, the circumferential surface of the first removable insert prevents the first fluid from flowing through the second connection port when the first removable insert is inserted into the first fluid channel and prevents the second fluid from flowing through the fourth connection port when the first removable insert is inserted into the second fluid channel.

In some embodiments, the second removable insert has an opening in a circumferential surface thereof. In some embodiments, the opening is configured to align with the second connection port when the second removable insert is inserted into the first fluid channel and to align with the fourth connection port when the second removable insert is inserted into the second fluid channel.

In some embodiments, the circumferential surface of the second removable insert prevents the first fluid from flowing through the first connection port when the second removable insert is inserted into the first fluid channel and prevents the second fluid from flowing through the third connection port when the second removable insert is inserted into the second fluid channel.

Another implementation of the present disclosure is a method for inverting a fluid supply within a thermostatic mixing valve. The method includes providing a valve body having a first fluid channel, a second fluid channel, and a cartridge chamber. The first fluid channel includes a first inlet port for receiving a first fluid from a first fluid supply line and the second fluid channel includes a second inlet port for receiving a second fluid from a second fluid supply line. The cartridge chamber has a first layer, a second layer offset from the first layer, and an opening for receiving a thermostatic mixing cartridge. The method further includes removing one of a first removable insert and a second removable insert from the first fluid channel, removing the other of the first removable insert and the second removable insert from the second fluid channel, inserting the one of the first removable insert and the second removable insert into the second fluid channel, and inserting the other of the first removable insert and the second removable insert into the first fluid channel. The first removable insert guides the first fluid to the first layer when inserted into the first fluid channel and guides the second fluid to the first layer when inserted into the second fluid channel. The second removable insert guides the first fluid to the second layer when inserted into the first fluid channel and guides the second fluid to the second layer when inserted into the second fluid channel.

In some embodiments, the first fluid channel has a first insert opening in addition to the first inlet port and the second fluid channel has a second insert opening in addition to the second inlet port. In some embodiments, the first and second removable inserts are insertable into the first and second fluid channels via the first and second insert openings.

In some embodiments, the first fluid channel includes a first connection port fluidly connected with the first layer of the cartridge chamber and a second connection port fluidly connected with the second layer of the cartridge chamber. In some embodiments, the second fluid channel includes a third connection port fluidly connected with the first layer of the cartridge chamber and a fourth connection port fluidly connected with the second layer of the cartridge chamber.

In some embodiments, each of the first and second removable inserts is a substantially cylindrical shell having an open end, a closed end opposite the open end, a circumferential surface connecting the open end with the closed end, and an opening in the circumferential surface thereof.

In some embodiments, inserting the first removable insert into the first fluid channel blocks the second connection port with the circumferential surface thereof and aligns the first connection port with the opening in the circumferential surface. In some embodiments, inserting the first removable insert into the second fluid channel blocks the fourth connection port with the circumferential surface thereof and aligns the third connection port with the opening in the circumferential surface.

In some embodiments, inserting the second removable insert into the first fluid channel blocks the first connection port with the circumferential surface thereof and aligns the second connection port with the opening in the circumferential surface. In some embodiments, inserting the second removable insert into the second fluid channel blocks the third connection port with the circumferential surface thereof and aligns the fourth connection port with the opening in the circumferential surface.

Another implementation of the present disclosure is a method for providing a thermostatic mixing valve. The method includes providing a valve body including a first fluid channel having a first inlet port for receiving a first fluid from a first fluid supply line, a second fluid channel having a second inlet port for receiving a second fluid from a second fluid supply line, and a cartridge chamber having a first layer, a second layer offset from the first layer, and an opening for receiving a thermostatic mixing cartridge. The method further includes providing a first removable insert configured to be insertable into the first fluid channel and the second fluid channel, wherein the first removable insert guides the first fluid to the first layer when inserted into the first fluid channel and guides the second fluid to the first layer when inserted into the second fluid channel. The method further includes providing a second removable insert configured to be insertable into the first fluid channel and the second fluid channel, wherein the second removable insert guides the first fluid to the second layer when inserted into the first fluid channel and guides the second fluid to the second layer when inserted into the second fluid channel.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before discussing the details of the thermostatic mixing valve and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring generally to the FIGURES, an improved thermostatic mixing valve and components thereof are shown according to an exemplary embodiment. The thermostatic mixing valve described herein may receive a hot fluid and a cold fluid from separate fluid supply lines and controllably mix the hot and cold fluids to achieve a desired temperature. The temperature of the mixed fluid may be maintained substantially constant at the desired temperature once set.

Advantageously, the thermostatic mixing valve of the present disclosure is adaptable to an inverted fluid supply line configuration. Such adaptability is provided by a pair of removable inserts. Each insert may be removed from a front face of the thermostatic valve and inserted into an opening previously occupied by the other insert. Each insert may guide a fluid from an inlet port on an exterior surface of the valve to a specific location within the valve regardless of the opening into which the insert is placed. This adaptability enables the thermostatic mixing valve to operate properly by simply swapping the removable inserts rather than replumbing the hot and cold fluid supply lines or reinstalling the valve in an upside-down configuration.

Figure 1:
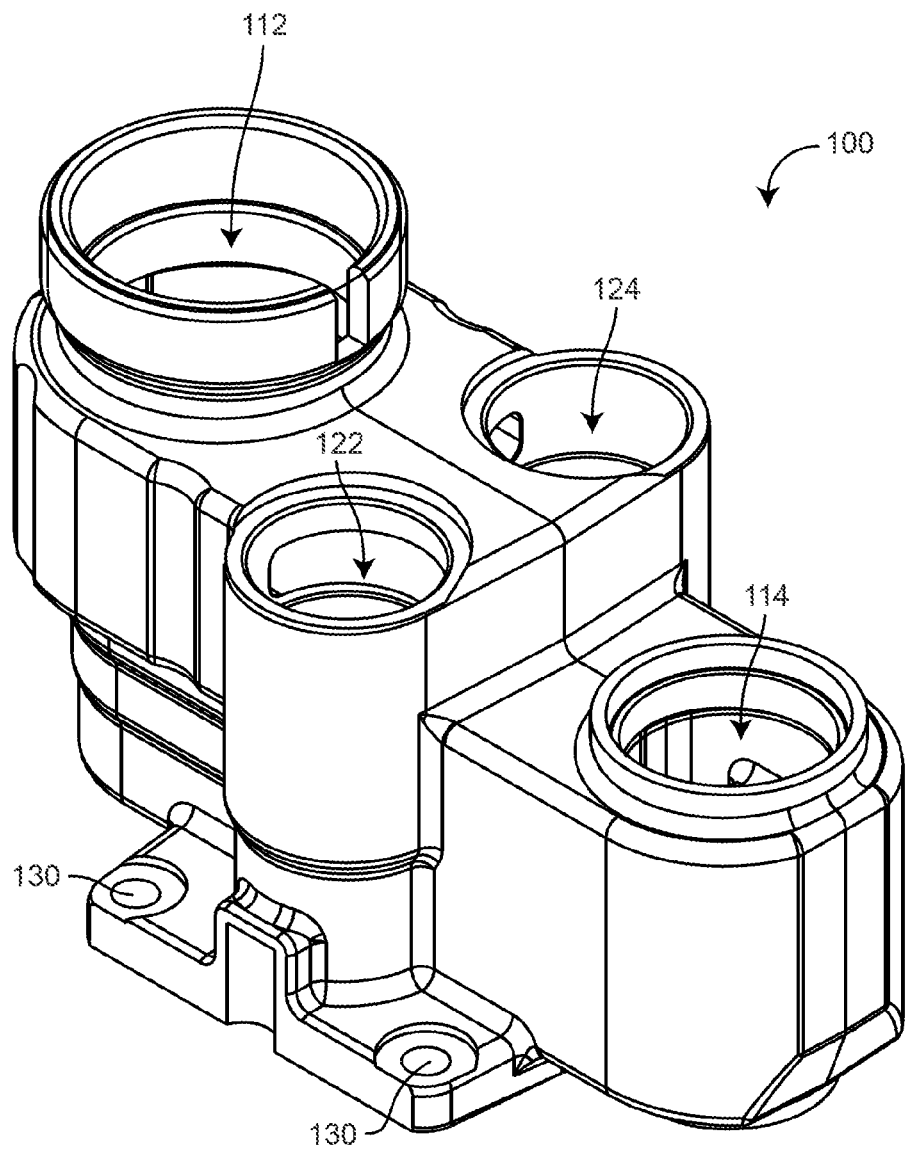
FIG. 1 is a side perspective view of a valve body for a thermostatic mixing valve, the valve body including a first inlet port, a second inlet port, a first outlet port, a second outlet port, a pair of openings for receiving removable inserts, and a pair of openings for receiving a thermostatic mixing cartridge and a volume control cartridge, according to an exemplary embodiment.
Figure 2:
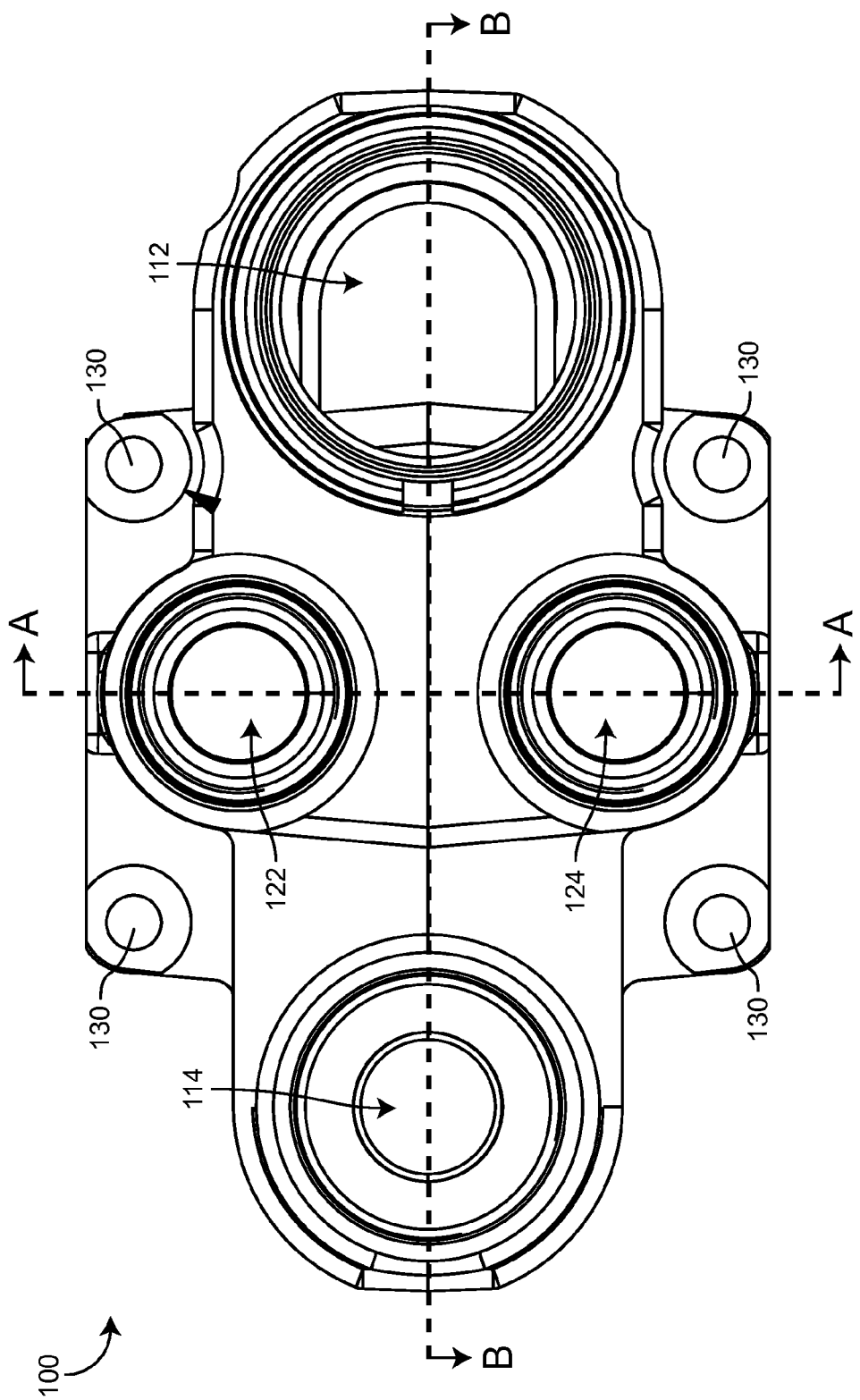
FIG. 2 is a front elevation view of the valve body shown in FIG. 1, according to an exemplary embodiment.
Figure 3:
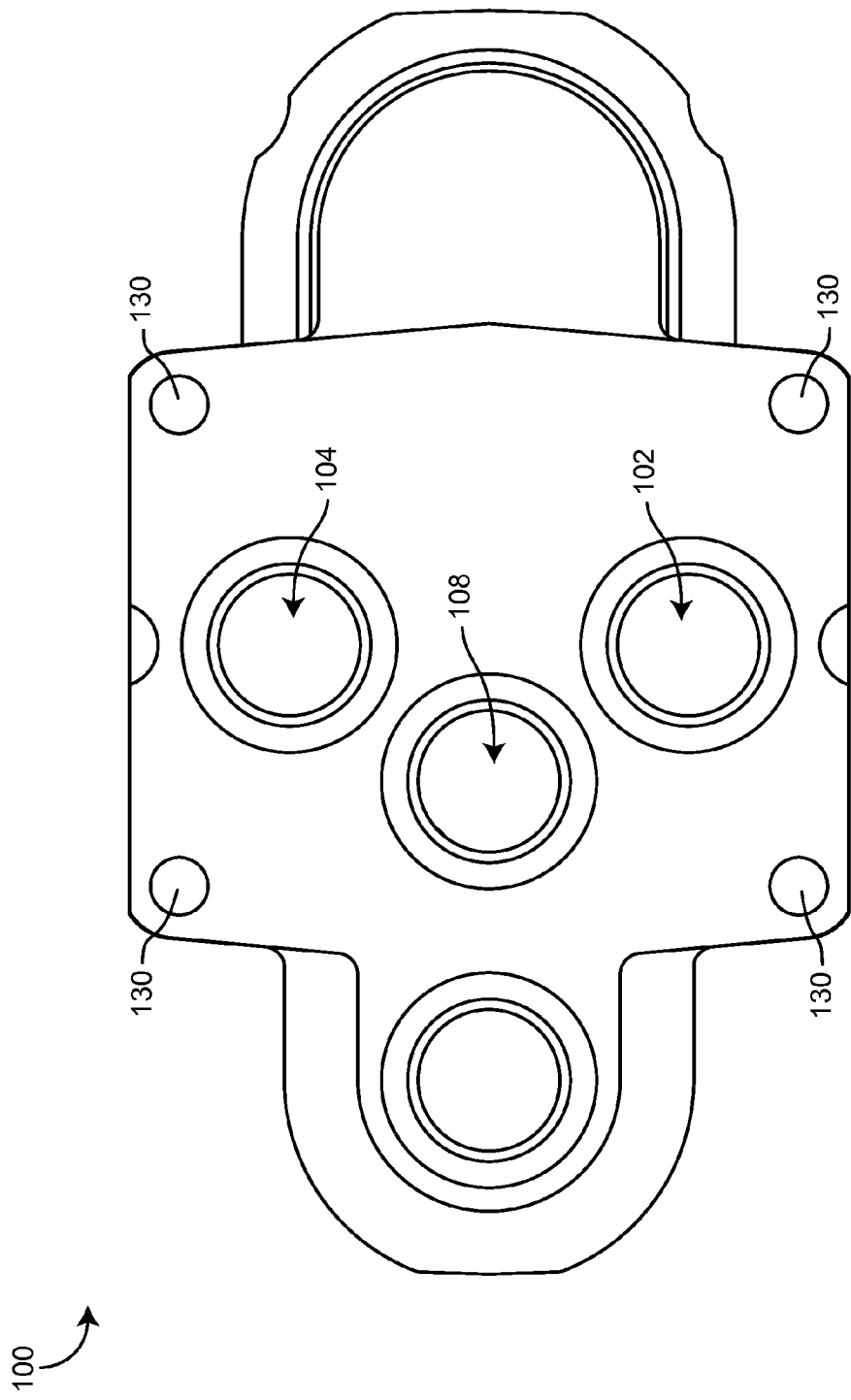
FIG. 3 is a rear elevation view of the valve body shown in FIG. 1, according to an exemplary embodiment.

Referring now to FIGS. 1-3, a valve body 100 for a thermostatic mixing valve is shown, according to an exemplary embodiment. Valve body 100 is shown to include a first inlet port 102 and a second inlet port 104. In some implementations, inlet port 102 may be connected to a hot water supply line and inlet port 104 may be connected to a cold water supply line. In other implementations, inlet port 102 may be connected to a cold water supply line and inlet port 104 may be connected to a hot water supply line. Advantageously, valve body 100 is adaptable to support either implementation. Although valve body 100 is described in the context of hot and cold water supply lines, it is contemplated that valve body 100 may be used to controllably mix any type of fluid (e.g., water, oils, liquids, gases, etc.).

Valve body 100 is shown to further include an outlet port 108. Outlet 108 may receive a mixed fluid from valve body 100 comprising a controlled mixture of the hot fluid and the cold fluid. In some implementations, outlet port 108 may be fluidly connected to a bathtub spout, a faucet, or a shower head. In other implementations, outlet port 108 may be fluidly connected to other types of plumbing fixtures. The fluidly connected plumbing fixture or fixtures may be located proximate to valve body 100 (e.g., in a same room or building zone, etc.) or remote to valve body 100 (e.g., in a different room, building zone, building, etc.).

In some embodiments, inlet ports 102,104 and outlet port 108 may be located on the rear surface of valve body 100. In other embodiments, inlet ports 102,104 and/or outlet port 108 may be located on a side surface, top surface, bottom surface, front surface, or other surface of valve body 100.

Valve body 100 is shown to further include several mounting holes 130. Holes 130 may be used to secure valve body 100 to a mounting surface such as a wall (e.g., an exterior wall surface, an interior wall surface, studs within a wall, etc.), or to a mounting bracket disposed between valve body 100 and the mounting surface. In some embodiments, holes 130 may be separated by a distance corresponding to a typical distance between wall studs for facilitating the mounting of valve body 100. Holes 130 may be used to secure a rear surface of valve body 100 to the mounting surface.

Still referring to FIGS. 1-3, valve body 100 is shown to further include a first cartridge chamber 112 and a second cartridge chamber 114. Cartridge chambers 112,114 are shown to include an open face disposed along a front surface of valve body 100. Cartridge chamber 112 may be configured to receive a thermostatic mixing cartridge (e.g., through the open face) for controlling the temperature of the mixed fluid. The thermostatic mixing cartridge may be used to set a desired temperature (e.g., via an attached temperature control handle) and maintain the desired temperature notwithstanding fluctuations in the temperatures of the hot and cold fluids received via inlet ports 102,104.

In some embodiments, the desired fluid temperature is obtained by controlling the relative proportions of hot and cold fluids admitted to a mixing chamber. To control the relative proportions of the hot and cold fluids admitted to the mixing chamber, a temperature-sensitive element may be provided. The temperature-sensitive element may expand or contract based on the temperature of a fluid in the mixing chamber (e.g., a mixed combination of the hot and cold fluids). In some embodiments, the temperature-sensitive element may be a coiled spring, a sealed chamber contained a temperature-sensitive fluid, or any other material or device having a temperature-dependent quality or attribute. In some embodiments, the temperature-sensitive element may be connected to a piston or poppet. The temperature-sensitive element may be configured to variably adjust an amount of the hot fluid and/or the cold fluid permitted to enter the mixing chamber based on the state of the temperature-sensitive element (e.g., by sliding across a fluid inlet port, by lifting from a face of a fluid inlet port, etc.).

While a number of thermostatic mixing cartridges could be used with valve body 100, several examples of suitable cartridges are disclosed in U.S. Pat. Nos. 6,279,604 and 7,240,850, both of which are hereby incorporated by reference in their entirety for their description of such devices. Some thermostatic mixing cartridges require the hot temperature fluid and the cold temperature fluid to be delivered to specific locations within the cartridge. Advantageously, valve body 100 can be used with such cartridges regardless of which inlet ports 102,104 receive the hot and cold temperature fluids.

Cartridge chamber 114 may be configured to receive a volume control cartridge for controlling the volumetric flow rate of the mixed fluid. Cartridge chambers 112,114 may be connected by a fluid mixing chamber. In operation, the thermostatic mixing cartridge may control an amount (e.g., an absolute amount, a relative proportion, a rate, etc.) of the hot and cold fluids permitted to enter the mixing chamber. The volume control cartridge may control an amount of the mixed fluid permitted to pass from the mixing chamber to outlet ports 108.

Valve body 100 is shown to further include a first opening 122 and a second opening 124. Openings 122,124 may be configured to receive removable inserts (e.g., inserts 150,160 shown in FIGS. 6A-7D) for guiding the hot and cold fluids from inlet ports 102,104 to cartridge chamber 112. Openings 122,124 may be disposed along a front surface, top surface, side surface, bottom surface, or any other surface of valve body 100.

Figure 4:
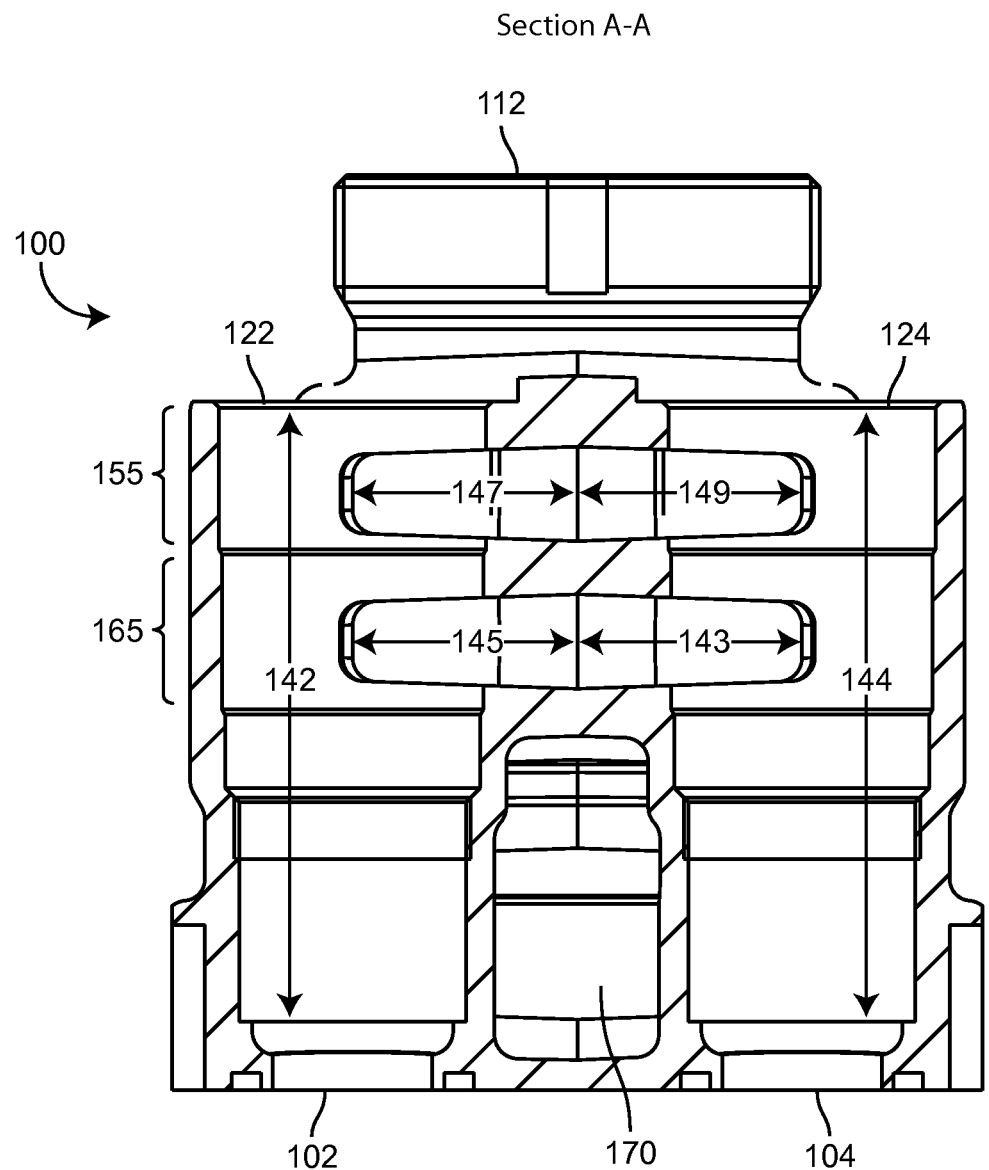
FIG. 4 is a cross-sectional plan view of the valve body shown in FIG. 1 taken along a line A-A visible in FIG. 2, according to an exemplary embodiment.

Referring now to FIG. 4, a cross-sectional view of valve body 100 is shown, according to an exemplary embodiment. The cross-section shown in FIG. 4 is taken along the line A-A visible in FIG. 2. As shown in FIG. 4, openings 122,124 may define a first end of fluid channels 142,144 extending at least partially through valve body 100. In some embodiments, fluid channels 142,144 extend entirely through valve body 100. Fluid channels 142,144 may connect openings 122,124 with inlet ports 102,104 respectively. Fluid channels 142,144 may extend from a front surface of valve body 100 (e.g., from openings 122,124) to a rear surface of valve body 100 (e.g., to inlet ports 102,104).

Fluid channel 142 is shown to include a first connection port 145 and a second connection port 147. Connection ports 145,147 may be located along a circumferential face of fluid channel 142. Connection port 145 may fluidly connect fluid channel 142 with a rear layer 165 of cartridge chamber 112. Connection port 147 may fluidly connect fluid channel 142 with a front layer 155 of cartridge chamber 112.

Fluid channel 144 is also shown to include a first connection port 143 and a second connection port 149. Connection ports 143,149 may be located along a circumferential face of fluid channel 144. Connection port 143 may fluidly connect fluid channel 144 with rear layer 165 of cartridge chamber 112. Connection port 149 may fluidly connect fluid channel 144 with a front layer 155 of cartridge chamber 112.

Figure 5:
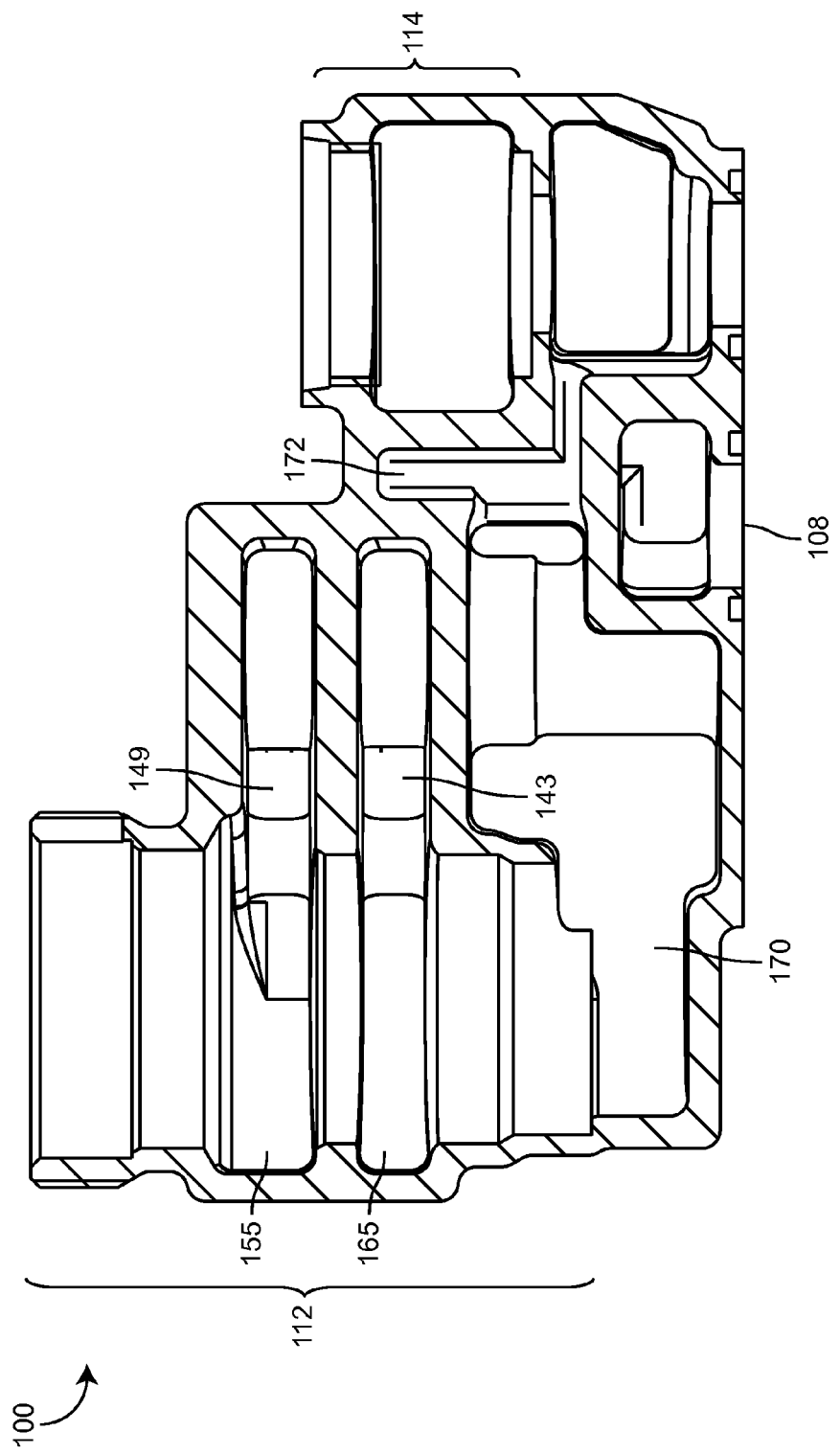
FIG. 5 is a side cross-sectional view of the valve body shown in FIG. 1, taken along a line B-B shown in FIG. 2, according to an exemplary embodiment.
Figure 6A:
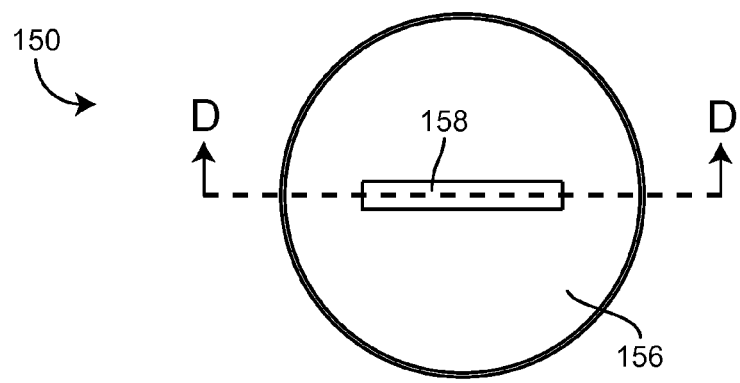
FIGS. 6A-6D are drawings of a first removable insert for delivering a fluid from either of the first or second inlet ports to a front layer of the thermostatic mixing cartridge, according to an exemplary embodiment.
Figure 6B:
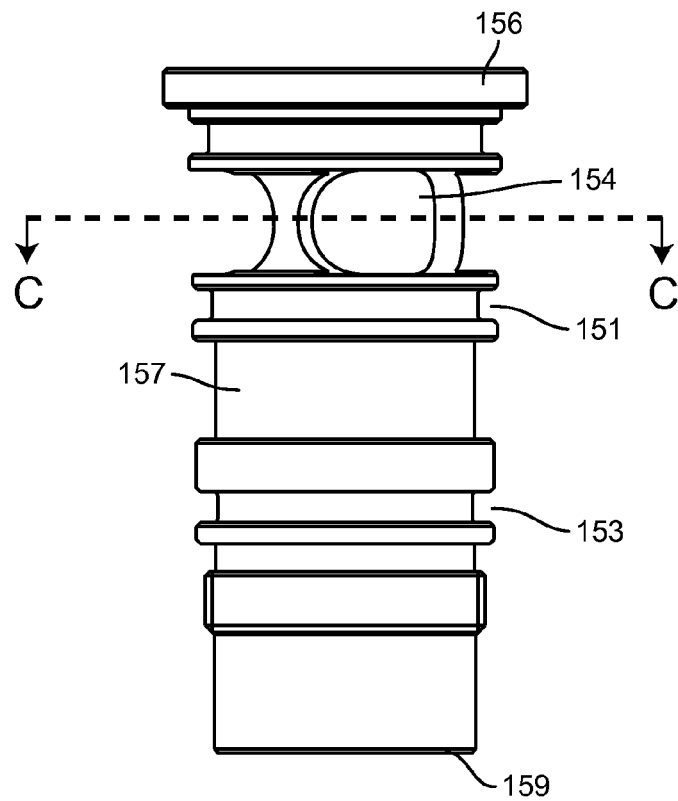
Figure 6C:
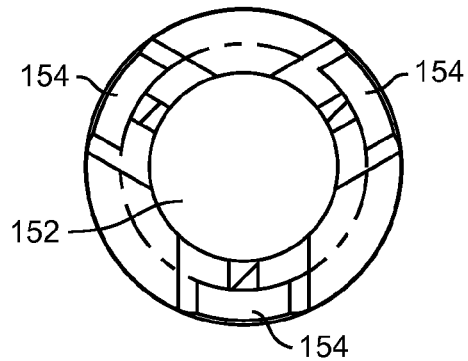
Figure 6D:
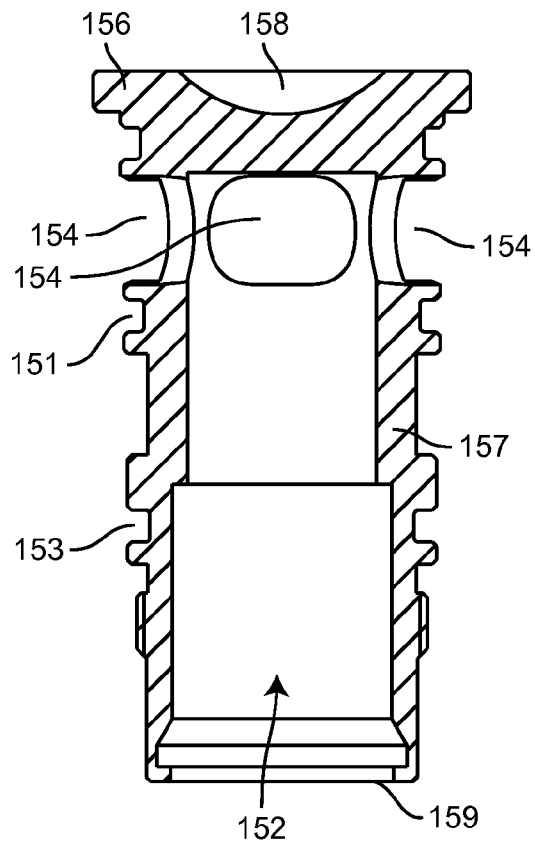
Figure 7A:
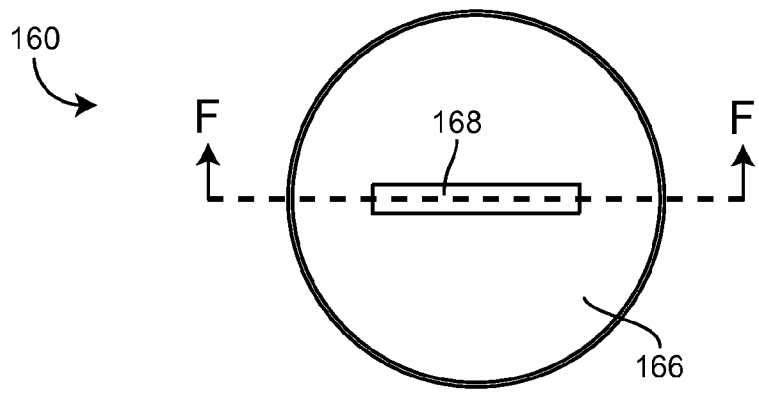
FIGS. 7A-7D are drawings of a second removable insert for delivering a fluid from either of the first or second inlet ports to a rear layer of the thermostatic mixing cartridge, according to an exemplary embodiment.
Figure 7B:
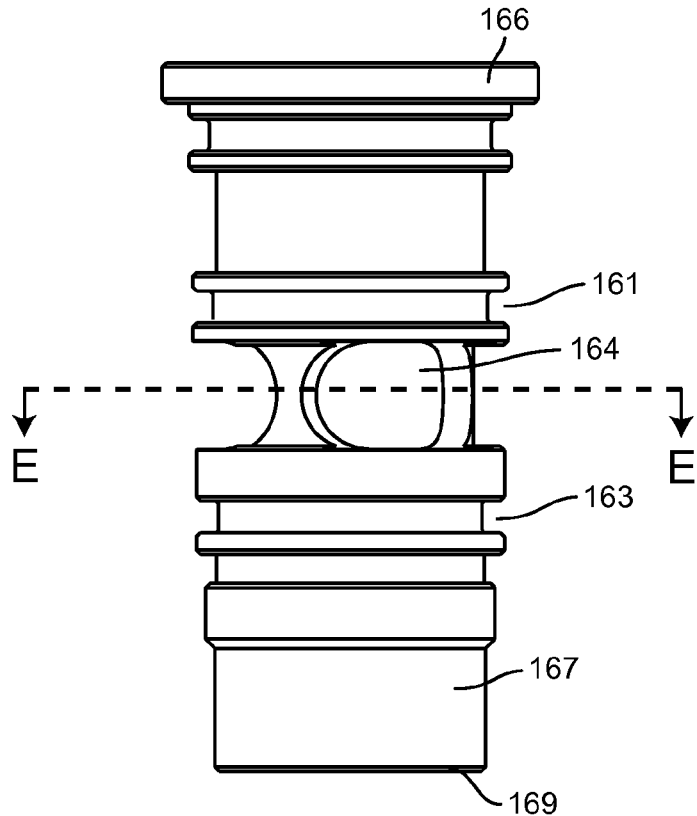
Figure 7C:
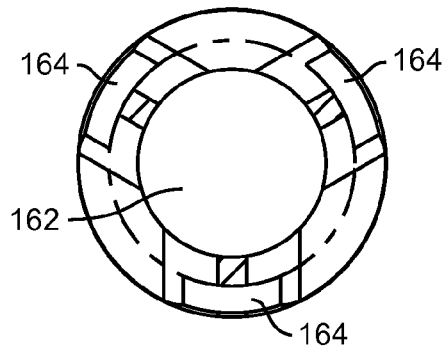
Figure 7D:
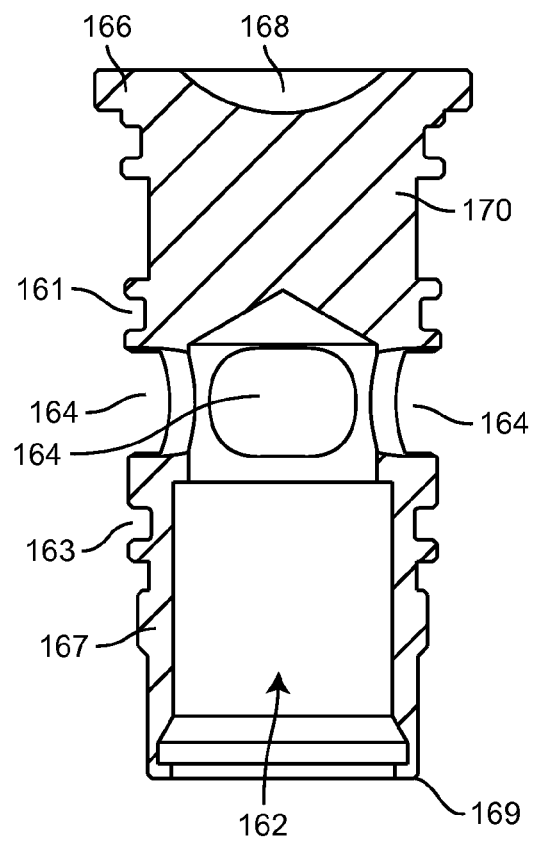

Referring now to FIG. 5, another cross-sectional view of valve body 100 is shown, according to an exemplary embodiment. The cross-section shown in FIG. 5 is taken along the line B-B visible in FIG. 2. As shown in FIG. 5, cartridge chamber 112 is shown to include a front layer 155 and a rear layer 165. Front layer 155 may be fluidly connected with connection ports 147,149. Rear layer 165 may be fluidly connected with connection ports 143,145. In some embodiments, a thermostatic mixing cartridge inserted into cartridge chamber 112 may variably open and close connection port 147 and/or connection port 149 to control an amount of fluid permitted to enter layer 155 from fluid channel 142 and/or fluid channel 144. Similarly, the thermostatic mixing cartridge may variably open and close connection port 145 and/or connection port 143 to control an amount of fluid permitted to enter layer 165 from fluid channel 142 and/or fluid channel 144. In some embodiments, the thermostatic mixing cartridge may control an amount of fluid from layer 155 and/or from layer 165 permitted to enter mixing chamber 170.

In operation, the mixed fluid from mixing chamber 170 may travel internally within valve body 100 through fluid channel 172 and into cartridge chamber 114. A volume control cartridge inserted into cartridge chamber 114 may variable control an amount of the mixed fluid permitted to pass through cartridge chamber 114 to outlet port 108. In some embodiments, the volume control cartridge may selectively divert the mixed fluid to outlet port 108.

Referring now to FIGS. 6A-6D, a first removable insert 150 is shown, according to an exemplary embodiment. Insert 150 is shown as a generally cylindrical shell 157 having an open end 159 and a closed end 156. Insert 150 is shown to include a plurality of openings 154 along a circumferential face of shell 157. In some embodiments, insert 150 may include three openings 154 spaced approximately 120 degrees apart along a circumferential face of shell 157. A fluid channel 152 is shown extending between open end 159 and openings 154 within shell 157.

Removable insert 150 may be inserted into either of fluid channels 142,144 (e.g., via openings 122,124) in valve body 100. When insert 150 is inserted into fluid channel 142, openings 154 may align with connection port 147. Such alignment may enable a fluid (e.g., a hot fluid or a cold fluid) from inlet port 102 to pass through insert 150 (e.g., via fluid channel 152) and enter front layer 155 of cartridge chamber 112. When insert 150 is inserted into fluid channel 144, openings 154 may align with connection port 149. Such alignment may enable a fluid (e.g., a cold fluid or a hot fluid) from inlet port 104 to pass through insert 150 and enter front layer 155 of cartridge chamber 112. When insert 150 is inserted into either fluid channel 142 or fluid channel 144, connection ports 143,145 may be obstructed by a closed circumferential face of shell 157. Accordingly, insert 150 may be used to direct a fluid from either of inlet ports 102,104 to layer 155 while preventing the fluid from entering layer 165.

In some embodiments, insert 150 may include circumferential grooves 151,153 extending along an outer circumferential face of shell 157. Grooves 151,153 may be used to seat a sealing element (e.g., a rubber o-ring, a perimeter seal, etc.) along an outer perimeter of shell 157. A seal seated in groove 151 may prevent leakage between layers 155,165 when insert 150 is inserted into either of fluid channels 142,144. A seal seated in groove 153 may prevent leakage between layer 165 and mixing chamber 170 when insert 150 is inserted into either of fluid channels 142,144. In some embodiments, insert 150 may further include a slot 158 along an outer surface of closed end 156. Slot 158 may be used to rotate insert 150 relative to valve body 100 or grip insert 150 for facilitating removal from fluid channels 142,144.

Referring now to FIGS. 7A-7D, a second removable insert 160 is shown, according to an exemplary embodiment. Insert 160 is shown to include a generally cylindrical shell portion 167, a closed end 166, and a solid portion 170 extending between closed end 166 and shell portion 167. Shell portion 167 is shown to include an open end 169 and a plurality of openings 164 along a circumferential face thereof. In some embodiments, insert 160 may include three openings 164 spaced approximately 120 degrees apart along a circumferential face of shell 167. A fluid channel 162 is shown extending between open end 169 and openings 164 within shell 167.

Removable insert 160 may be inserted into either of fluid channels 142,144 (e.g., via openings 122,124) in valve body 100. When insert 160 is inserted into fluid channel 142, openings 164 may align with connection port 145. Such alignment may enable a fluid from inlet port 102 to pass through insert 160 (e.g., via fluid channel 162) and enter rear layer 165 of cartridge chamber 112. When insert 160 is inserted into fluid channel 144, openings 164 may align with connection port 143. Such alignment may enable a fluid from inlet port 104 to pass through insert 160 and rear front layer 165 of cartridge chamber 112. When insert 160 is inserted into either fluid channel 142 or fluid channel 144, connection ports 147,149 may be obstructed by solid portion 170. Accordingly, insert 160 may be used to direct a fluid from either of inlet ports 102,104 to layer 165 while preventing the fluid from entering layer 155.

In some embodiments, insert 160 may include circumferential grooves 161,163 extending along an outer circumferential face of shell 167. Grooves 161,163 may be used to seat a sealing element (e.g., a rubber o-ring, a perimeter seal, etc.) along an outer perimeter of shell 167. A seal seated in groove 161 may prevent leakage between layers 155,165 when insert 160 is inserted into either of fluid channels 142,144. A seal seated in groove 163 may prevent leakage between layer 165 and mixing chamber 170 when insert 160 is inserted into either of fluid channels 142,144. In some embodiments, insert 160 may further include a slot 168 along an outer surface of closed end 166. Slot 168 may be used to rotate insert 160 relative to valve body 100 or grip insert 160 for facilitating removal from fluid channels 142,144.

Figure 8A:
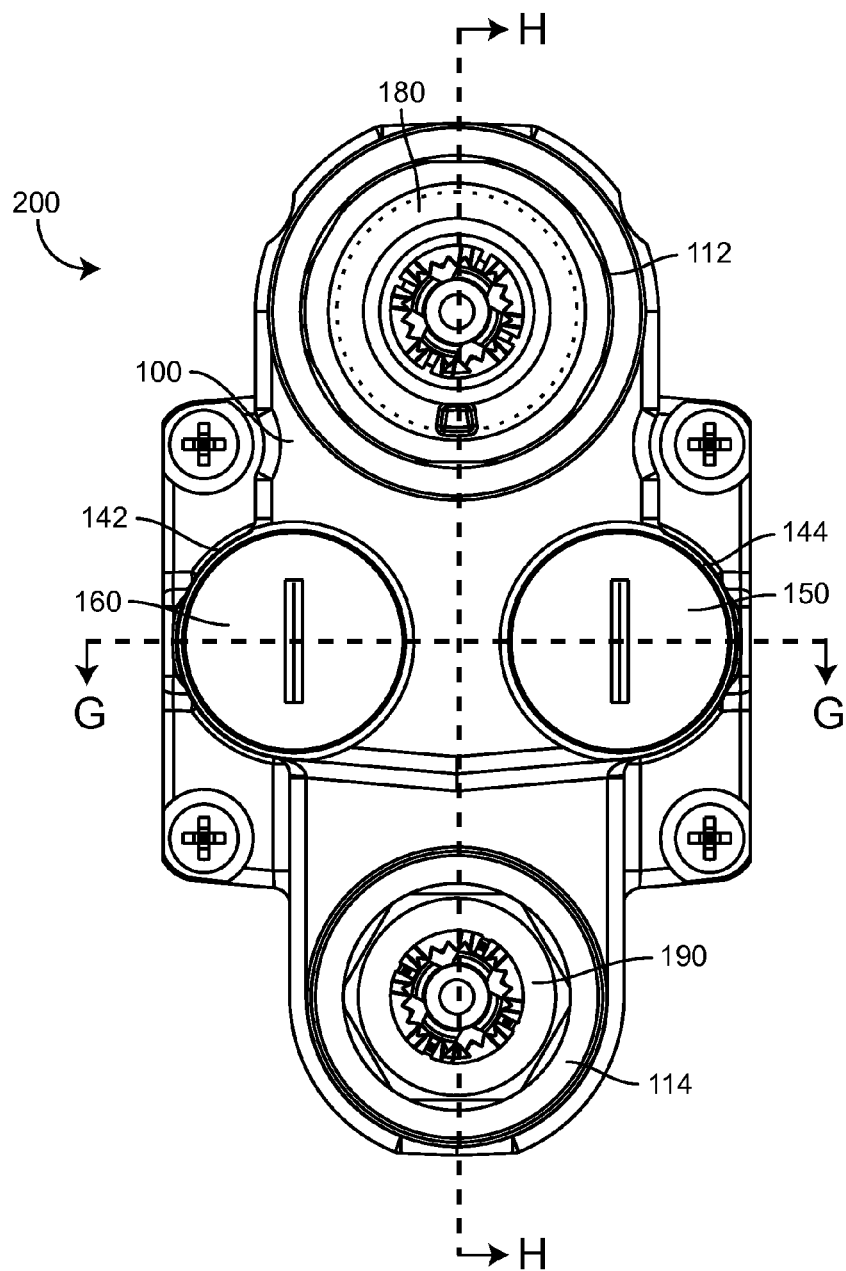
FIGS. 8A-8C are drawings of an assembled thermostatic mixing valve, showing the first removable insert delivering fluid from the second inlet port to the front layer of the thermostatic mixing cartridge and showing the second removable insert delivering fluid from the first inlet port to the rear layer of the thermostatic mixing cartridge, according to an exemplary embodiment.
Figure 8B:
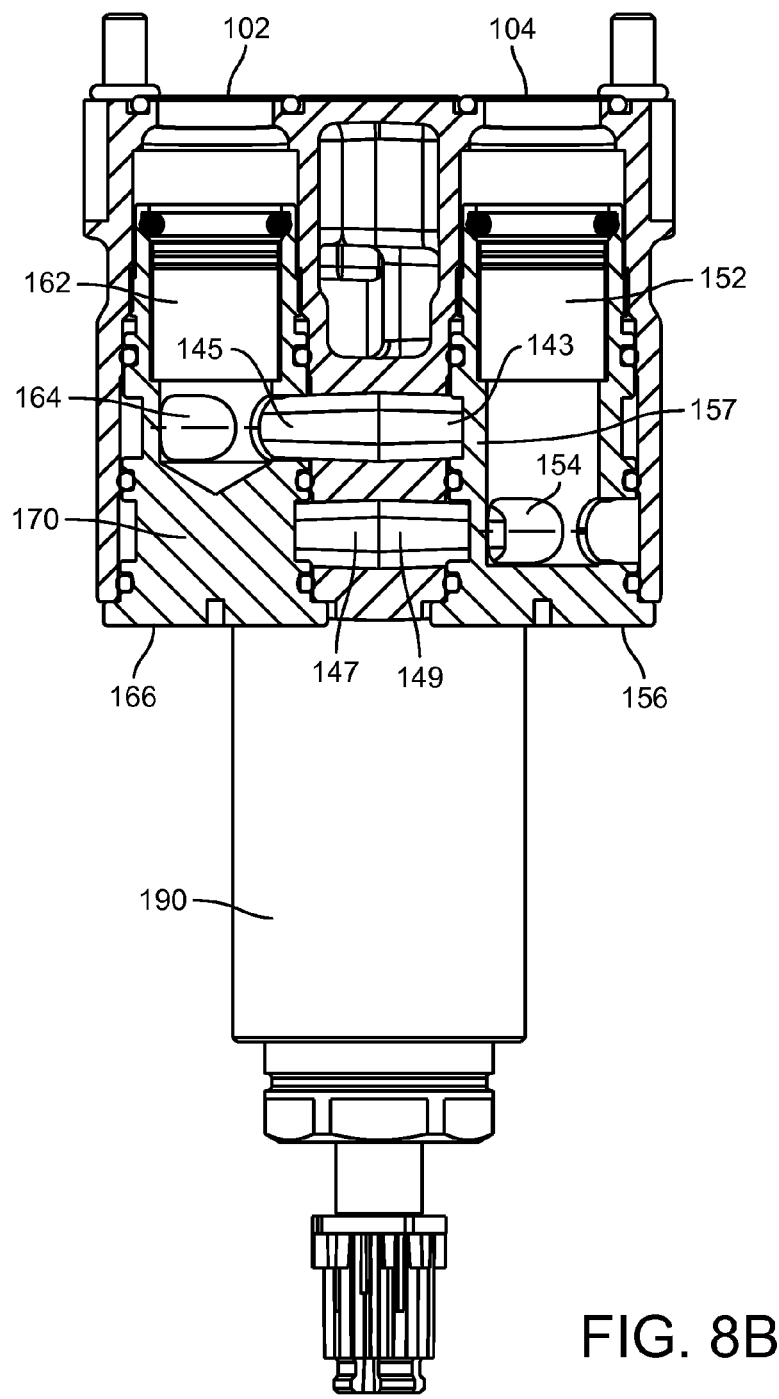
Figure 8C:
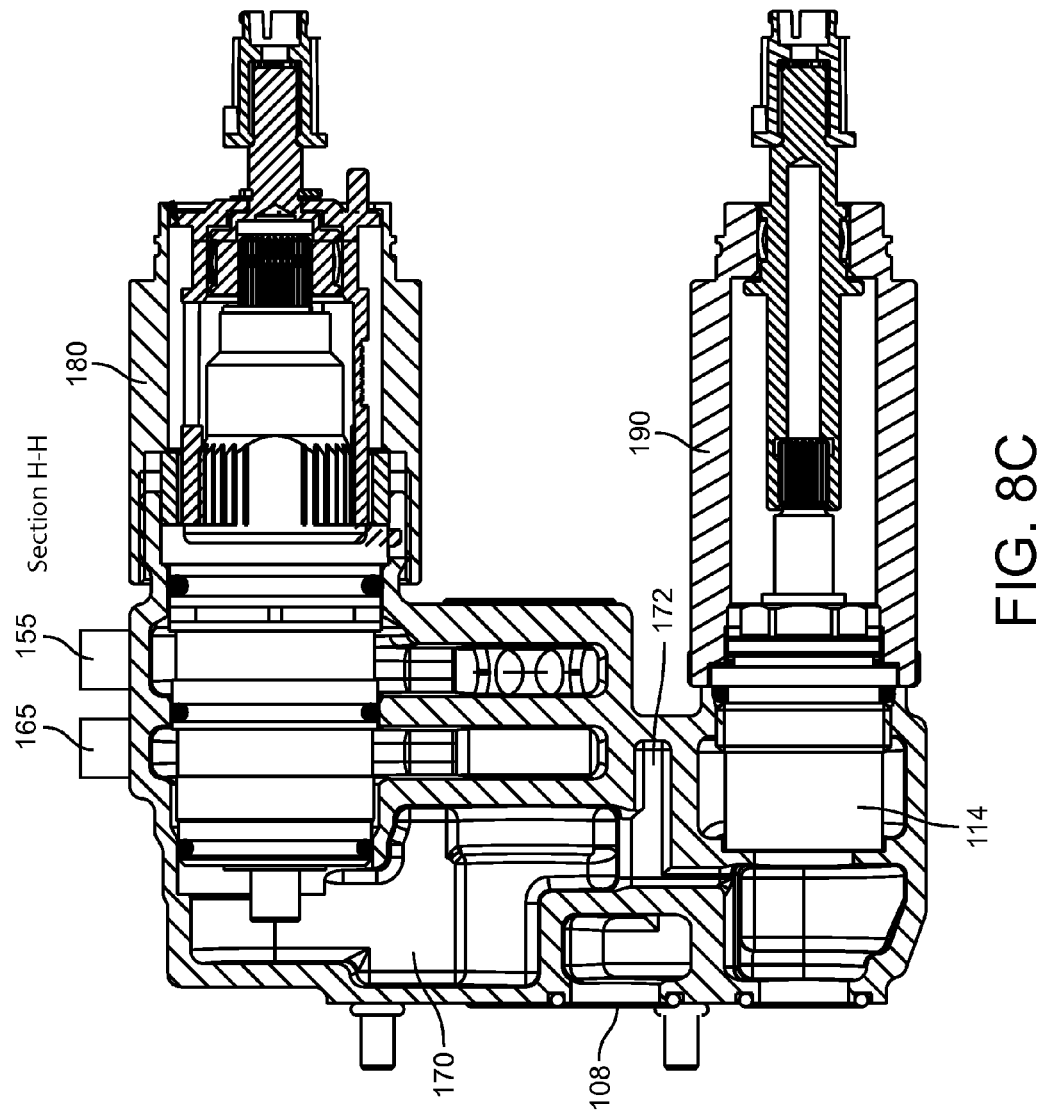

Referring now to FIGS. 8A-8C, an assembled thermostatic mixing valve 200 is shown, according to an exemplary embodiment. Referring specifically to FIG. 8A, a front view of mixing valve 200 is shown. Thermostatic mixing valve 200 is shown to include valve body 100, removable insert 150, removable insert 160, a thermostatic mixing cartridge 180, and a volume control cartridge 190. Removable insert 150 is shown inserted into fluid channel 144 and removable insert 160 is shown inserted into fluid channel 142. In other implementations, removable insert 150 may be inserted into fluid channel 142 and removable insert 160 may be inserted into fluid channel 144. The positions of inserts 150,160 may be swapped to adapt thermostatic mixing valve 200 to various hot and cold fluid inlet configurations. Thermostatic mixing cartridge 180 is shown inserted into cartridge chamber 112 and volume control cartridge 190 is shown inserted into cartridge chamber 114.

Referring specifically to FIG. 8B, a cross-sectional view of mixing valve 200 is shown, according to an exemplary embodiment. The cross-section shown in FIG. 8B is taken along a line G-G visible in FIG. 8A. As shown in FIG. 8B, a first fluid (e.g., hot water) may enter valve body 100 through inlet port 102 and travel through fluid channel 162 within removable insert 160. The first fluid may exit fluid channel 162 via openings 164 and pass through connection port 145 into rear layer 165 of cartridge chamber 112. The first fluid may be blocked from reaching connection port 147 and front layer 155 by solid portion 170.

A second fluid (e.g., cold water) may enter valve body 100 through inlet port 104 and travel through fluid channel 152 within removable insert 150. The second fluid may exit fluid channel 152 via openings 154 and pass through connection port 149 into front layer 155 of cartridge chamber 112. The second fluid may be blocked from connection port 143 by a closed circumferential face of shell 157. Accordingly, the arrangement shown in FIG. 8B may deliver the first fluid (e.g., from inlet port 102) to layer 165 and deliver the second fluid (e.g., from inlet port 104) to layer 155.

Advantageously, thermostatic mixing valve 200 may be adjusted to deliver the first fluid to layer 155 and deliver the second fluid to layer 165. Such adjustment may be performed by removing insert 150 from fluid channel 144 and removing insert 160 from fluid channel 142. Each of inserts 150,160 may then be reinserted into valve body 100 into the fluid channel previously occupied by the other insert. That is, insert 150 may be inserted into fluid channel 142 and insert 160 may be inserted into fluid channel 144.

After swapping inserts 150 and 160, the first fluid (e.g., hot water) may still enter valve body 100 through inlet port 102. However, the first fluid will now travel through fluid channel 152 within removable insert 150. The first fluid may exit fluid channel 152 via openings 154 and pass through connection port 147 into front layer 155 of cartridge chamber 112. The first fluid may be blocked from connection port 145 by a closed circumferential face of shell 157.

The second fluid (e.g., cold water) may still enter valve body 100 through inlet port 104. However, the second fluid will now travel through fluid channel 162 within removable insert 160. The second fluid may exit fluid channel 162 via openings 164 and pass through connection port 143 into rear layer 165 of cartridge chamber 112. The second fluid may be blocked from reaching connection port 149 and front layer 155 by solid portion 170. Accordingly, after swapping inserts 150,160, the first fluid (e.g., from inlet port 102) is delivered to layer 155 and the second fluid (e.g., from inlet port 104) is delivered to layer 165.

Referring specifically to FIG. 8C, another cross-sectional view of mixing valve 200 is shown, according to an exemplary embodiment. The cross-section shown in FIG. 8C is taken along a line H-H visible in FIG. 8A. As shown in FIG. 8C, thermostatic mixing cartridge 180 may control an amount of the first and second fluids permitted to enter mixing chamber 170. In some embodiments, thermostatic mixing cartridge 180 may exercise temperature control by variably opening and closing connection ports 145,143,147,149. The first and second fluids may combine in mixing chamber 170 and travel through fluid passage 172 to cartridge chamber 114. Volume control cartridge 190 may exercise volume control over the mixed fluid by increasing or decreasing an amount of the mixed fluid permitted to pass through cartridge chamber 114. The mixed fluid may exit valve body 100 via outlet port 108.

Advantageously, swapping inserts 150 and 160 adaptively inverts the destination layers (e.g., layer 155 and 165) of the fluids from ports 102,104 without requiring a user to replumb the fluid supply lines or reinstall valve body 100 in the mounting surface. This adaptability enables thermostatic mixing valve 200 to operate properly without replumbing the hot and cold fluid supply lines or reinstalling valve 200 in an upside-down configuration.

The construction and arrangement of the elements of the thermostatic mixing valves and components thereof as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An assembly for a thermostatic mixing valve, the assembly comprising:
    a valve body including a first fluid channel having a first inlet port for receiving a first fluid from a first fluid supply line, a second fluid channel having a second inlet port for receiving a second fluid from a second fluid supply line, and a cartridge chamber having a first layer, a second layer offset from the first layer, and an opening for receiving a thermostatic mixing cartridge;
    a first removable insert configured to be insertable into the first fluid channel and the second fluid channel, wherein the first removable insert guides the first fluid to the first layer when inserted into the first fluid channel and guides the second fluid to the first layer when inserted into the second fluid channel; and
    a second removable insert configured to be insertable into the first fluid channel and the second fluid channel, wherein the second removable insert guides the first fluid to the second layer when inserted into the first fluid channel and guides the second fluid to the second layer when inserted into the second fluid channel.

2. The assembly of claim 1, wherein the first fluid channel has a first insert opening in addition to the first inlet port and the second fluid channel has a second insert opening in addition to the second inlet port,
    wherein the first and second removable inserts are insertable into the first and second fluid channels via the first and second insert openings.

3. The assembly of claim 2, wherein the first insert opening and the second insert opening are located along a same surface of the valve body, and
    wherein the first removable insert and the second removable insert are inserted into the first and second openings in a same direction as the thermostatic cartridge is inserted into the cartridge chamber.

4. The assembly of claim 1, wherein the valve body further includes:
    a mixing chamber fluidly connected with the cartridge chamber for receiving the thermostatic mixing cartridge;
    a second cartridge chamber for receiving a volume control cartridge; and
    a fluid passage connecting the mixing chamber with the second cartridge chamber.

5. The assembly of claim 1, wherein the first fluid channel includes a first connection port fluidly connected with the first layer of the cartridge chamber and a second connection port fluidly connected with the second layer of the cartridge chamber, and
    wherein the second fluid channel includes a third connection port fluidly connected with the first layer of the cartridge chamber and a fourth connection port fluidly connected with the second layer of the cartridge chamber.

6. The assembly of claim 5, wherein the first fluid channel and the second fluid channel are substantially cylindrical channels extending completely through the valve body, and
    wherein the connection ports are openings in circumferential faces of the first and second fluid channels.

7. The assembly of claim 5, wherein each of the first and second removable inserts is a substantially cylindrical shell having an open end, a closed end opposite the open end, and a circumferential surface connecting the open end with the closed end,
    wherein the closed ends completely cover openings in the valve body through which the removable inserts are inserted into the first and second fluid channels when the removable inserts are inserted into the fluid channels.

8. The assembly of claim 7, wherein each of the first and second removable inserts include a plurality of openings in the circumferential surfaces thereof,
    wherein the openings in the circumferential surface of the first removable insert are configured to align with the first layer of the cartridge chamber when the first removable insert is inserted into either of the first or second fluid channels, and
    wherein the openings in the circumferential surface of the second removable insert are configured to align with the second layer of the cartridge chamber when the second removable insert is inserted into either of the first or second fluid channels.

9. The assembly of claim 7, wherein the first and second removable inserts are configured to receive the first and second fluids via the open ends thereof and to guide the first and second fluids to a subset of the connection ports when inserted into the first and second fluid channels.

10. The assembly of claim 9, wherein the first removable insert is configured to guide the first fluid to the first connection port when inserted into the first fluid channel and to guide the second fluid to the third connection port when inserted into the second fluid channel; and
    wherein the second removable insert is configured to guide the first fluid to the second connection port when inserted into the first fluid channel and to guide the second fluid to the fourth connection port when inserted into the second fluid channel.

11. The assembly of claim 5, wherein the first removable insert has an opening in a circumferential surface thereof,
    wherein the opening is configured to align with the first connection port when the first removable insert is inserted into the first fluid channel and to align with the third connection port when the first removable insert is inserted into the second fluid channel.

12. The assembly of claim 11, wherein the circumferential surface of the first removable insert prevents the first fluid from flowing through the second connection port when the first removable insert is inserted into the first fluid channel and prevents the second fluid from flowing through the fourth connection port when the first removable insert is inserted into the second fluid channel.

13. The assembly of claim 5, wherein the second removable insert has an opening in a circumferential surface thereof,
wherein the opening is configured to align with the second connection port when the second removable insert is inserted into the first fluid channel and to align with the fourth connection port when the second removable insert is inserted into the second fluid channel.

14. The assembly of claim 13, wherein the circumferential surface of the second removable insert prevents the first fluid from flowing through the first connection port when the second removable insert is inserted into the first fluid channel and prevents the second fluid from flowing through the third connection port when the second removable insert is inserted into the second fluid channel.

15. A method for inverting a fluid supply within a thermostatic mixing valve, the method comprising:
installing a valve body including a first fluid channel having a first inlet port for receiving a first fluid from a first fluid supply line, a second fluid channel having a second inlet port for receiving a second fluid from a second fluid supply line, and a cartridge chamber having a first layer, a second layer offset from the first layer, and an opening for receiving a thermostatic mixing cartridge,
removing one of a first removable insert and a second removable insert from the first fluid channel;
removing the other of the first removable insert and the second removable insert from the second fluid channel;
inserting the one of the first removable insert and the second removable insert into the second fluid channel; and
inserting the other of the first removable insert and the second removable insert into the first fluid channel,
wherein the first removable insert guides the first fluid to the first layer when inserted into the first fluid channel and guides the second fluid to the first layer when inserted into the second fluid channel, and
wherein the second removable insert guides the first fluid to the second layer when inserted into the first fluid channel and guides the second fluid to the second layer when inserted into the second fluid channel.

16. The method of claim 15, wherein each of the first and second removable inserts is a substantially cylindrical shell having an open end, a closed end opposite the open end, a circumferential surface connecting the open end with the closed end, and an opening in the circumferential surface thereof.

17. The method of claim 15, wherein the first fluid channel includes a first connection port fluidly connected with the first layer of the cartridge chamber and a second connection port fluidly connected with the second layer of the cartridge chamber, and
wherein the second fluid channel includes a third connection port fluidly connected with the first layer of the cartridge chamber and a fourth connection port fluidly connected with the second layer of the cartridge chamber.

18. The method of claim 17, wherein inserting the first removable insert into the first fluid channel blocks the second connection port with the circumferential surface thereof and aligns the first connection port with the opening in the circumferential surface, and
wherein inserting the first removable insert into the second fluid channel blocks the fourth connection port with the circumferential surface thereof and aligns the third connection port with the opening in the circumferential surface.

19. The method of claim 17, wherein inserting the second removable insert into the first fluid channel blocks the first connection port with the circumferential surface thereof and aligns the second connection port with the opening in the circumferential surface, and
wherein inserting the second removable insert into the second fluid channel blocks the third connection port with the circumferential surface thereof and aligns the fourth connection port with the opening in the circumferential surface.

20. A method for providing a thermostatic mixing valve, the method comprising:
providing a valve body including a first fluid channel having a first inlet port for receiving a first fluid from a first fluid supply line, a second fluid channel having a second inlet port for receiving a second fluid from a second fluid supply line, and a cartridge chamber having a first layer, a second layer offset from the first layer, and an opening for receiving a thermostatic mixing cartridge;
providing a first removable insert configured to be insertable into the first fluid channel and the second fluid channel, wherein the first removable insert guides the first fluid to the first layer when inserted into the first fluid channel and guides the second fluid to the first layer when inserted into the second fluid channel; and
providing a second removable insert configured to be insertable into the first fluid channel and the second fluid channel, wherein the second removable insert guides the first fluid to the second layer when inserted into the first fluid channel and guides the second fluid to the second layer when inserted into the second fluid channel.

* * * * *